UNITED STATES PATENT OFFICE.

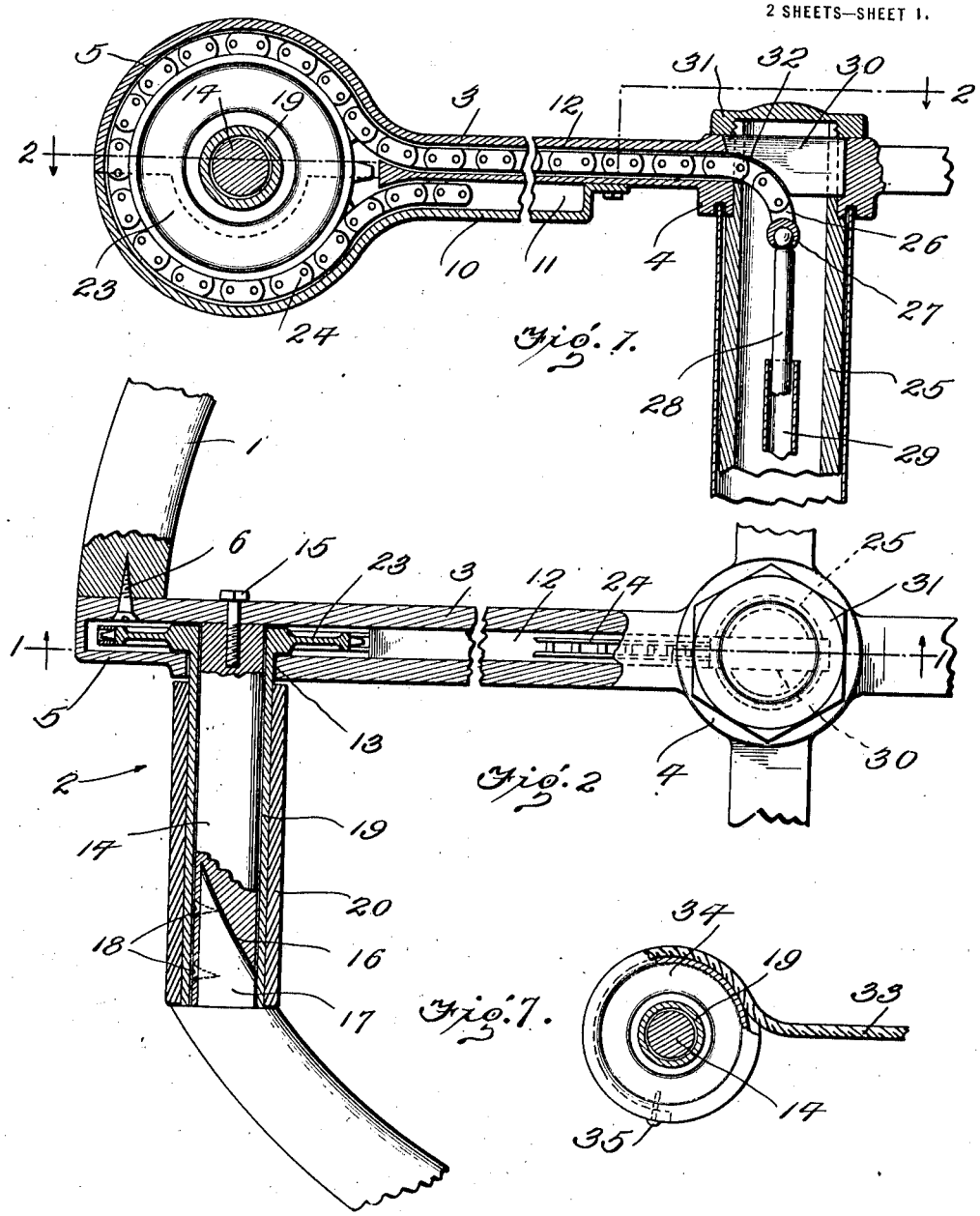

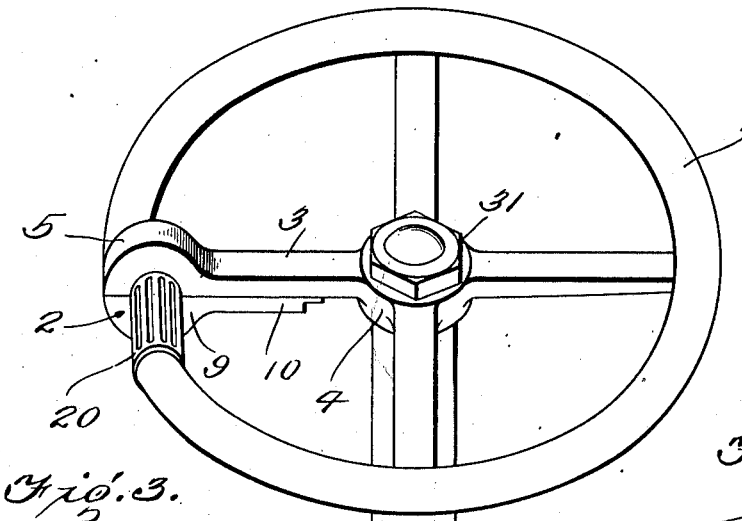
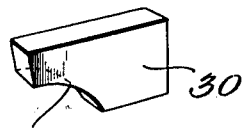
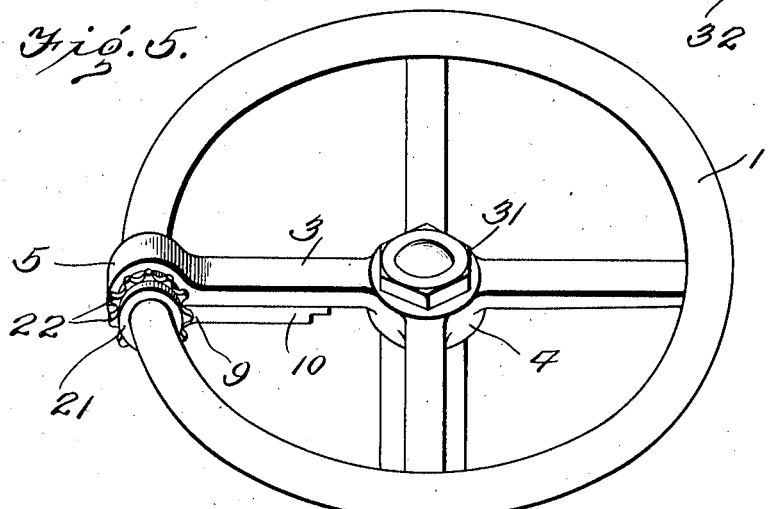
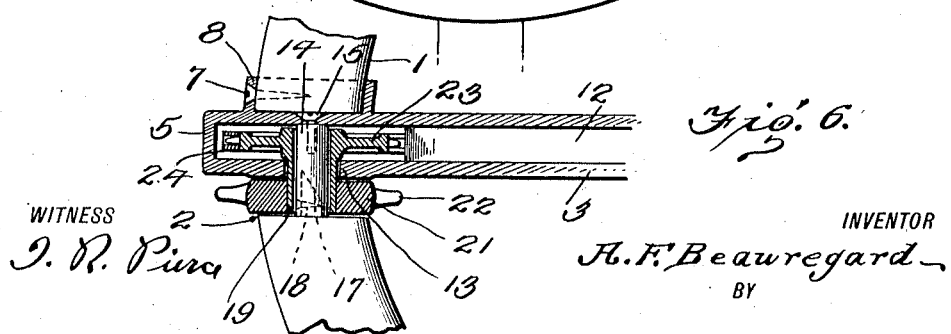

ALBERT FRANK BEAUREGARD, OF WEST DE PERE, WISCONSIN.

GAS CONTROL FOR MOTOR-VEHICLES.

1,311,800.     Specification of Letters Patent.     Patented July 29, 1919.

Application filed March 27, 1919. Serial No. 285,519.

*To all whom it may concern:*

Be it known that I, ALBERT F. BEAUREGARD, a citizen of the United States, residing at West De Pere, in the county of Brown and State of Wisconsin, have invented certain new and useful Improvements in Gas Controls for Motor-Vehicles; and I do declare the following to be a full, clear, and exact description of the invention, such as will enable others skilled in the art to which it appertains to make and use the same.

My invention has for its object to provide a simply constructed, easily operated and sensitive hand-control for motor vehicles which will permit the speed of the motor to be readily varied without removing either hand from the steering wheel.

With the foregoing in view, further objects are to provide an operating handle at the rim of the steering wheel, and to locate the control member for transferring motion from the handle to the gas or other control, in a hollow spoke of the wheel.

A still further object is to provide a double-acting key for locking the steering wheel to the steering shaft and for guiding the aforesaid control member from the hollow spoke into said shaft.

With the foregoing in view, the invention resides in the novel features of construction and unique association of parts hereinafter fully described and claimed, reference being made to the accompanying drawings.

Figure 1 is a vertical section of a portion of a steering wheel showing the application of my invention thereto.

Fig. 2 is a top plan view of a portion of the wheel with parts in section on the planes indicated by the line 2—2 of Fig. 1; and Fig. 2 discloses the line 1—1 upon which Fig. 1 is taken.

Fig. 3 is a perspective view of a complete steering wheel embodying the features shown in Figs. 1 and 2.

Fig. 4 is a perspective view of the key which locks the steering wheel to the steering shaft.

Fig. 5 is a perspective view showing a slightly different form of construction.

Fig. 6 is a horizontal section of the device shown in Fig. 5.

Fig. 7 is a detail vertical section showing a still further modification.

In the drawings above briefly described, the numeral 1 designates the rim of the steering wheel, said rim having a gap 2 and a hollow spoke 3 extending from the wheel hub 4 into said gap, with its outer end enlarged to form a casing 5 disposed vertically and secured by a screw 6 or by the screw and socket 7 and 8, Fig. 6, to the rim 1, at one end of the gap 2. The casing 5 is by preference provided with a removable bottom 9 which extends horizontally to a suitable extent beneath the spoke 3 and is detachably secured thereto, the interior of the extended portion 10 of the section 9 forming a lower passage 11 parallel with the passage 12 within the spoke. The two passages communicate at the outer end of the spoke 3, or in other words, open into the circular casing 5.

The side of the casing 5 opposite the side which is secured to the rim 1, is provided with a circular opening 13, and a stud shaft 14 extends through said opening and is secured by a screw or the like 15 to the opposite side of the casing. The stub shaft 14 extends to the end of the gap 2, opposite the end to which the casing 5 is secured, and may well be provided with a socket 16 receiving a tenon 17 on the rim, one or more screws 18 being preferably employed for securing said tenon in the socket. A tubular shaft 19 rotatably surrounds the stub shaft 14 and is either provided with a hand grip 20 as shown in Figs. 2 and 3 or with a wheel 21 having projections 22 to be engaged by the thumb of the user (see Figs. 5 and 6). By either means, the shaft 19 may be rotated and it is by such rotation that the supply of gas to the motor is controlled. When a thumb wheel such as 21 is used, it occupies less space than a hand grip 20 and consequently the gap 2 is of less width and the shafts 14 and 19 are of less length.

A sprocket wheel 23 is mounted on the inner end of the stub shaft 14 and housed within the casing 5, and a sprocket chain 24 is trained around said sprocket wheel, the two reaches of said chain sliding respectively in the passages 11 and 12. The upper reach of the chain 24 extends into the hollow steering shaft 25 upon which the steering wheel is mounted and curves downwardly into said hollow shaft as seen at 26. By means of a ball joint or the like 27, the upper reach of the chain 24 is connected to a vertically sliding control rod 28 within the shaft 25 and a tubular guide 29 may well be provided for said rod. By the arrangement set forth, turning of the hand grip 20 on the thumb wheel 21 will rotate the sprocket 23 and so slide the sprocket chain 24 as to push or pull upon the control rod 28, as required, thus placing the feeding of fuel to the motor, under the full control of the operator without taking either hand from the rim of the steering wheel; and by means of the ball connection 27 a swivel is provided which permits free turning of the steering wheel without rotating the rod 28. It will be understood, however, that in some forms of the invention, the rod 28 might well turn with the wheel.

For relatively holding the steering wheel and the shaft 25 and at the same time for guiding the downward curve 26 of the chain 24, I provide a transverse key 30 which is held in place by the usual nut 31 threaded on the upper end of the aforesaid shaft, one lower corner of said key being cut away on a curved line as seen at 32 for contact with the downwardly curving part 26 of the chain 24. This arrangement not only effectively guides the chain to prevent buckling thereof in passing from the spoke into the shaft, but also effectively keys the steering wheel to said shaft.

In some instances, a metal cable or flexible shaft 33 such as seen in Fig. 7, may be substituted for the chain 24, in which instance it will be necessary to employ a pulley or drum 34 upon the shaft 19, said cable or flexible shaft being suitably secured to the pulley or drum by any preferred means such as the screw 35.

From the foregoing, taken in connection with the accompanying drawings, it will be seen that although I have provided a comparatively simple and inexpensive device for carrying out the objects of the invention, such device will be highly efficient and in every way desirable; and since probably the best results are obtained from the details disclosed, they may well be followed, but within the scope of the invention as claimed, considerable latitude is allowed for making such minor changes as occasion may dictate.

I claim:—

1. In a motor vehicle control, a steering wheel having a hollow spoke, a rotary handle on the exterior of the outer end of said hollow spoke with its axis extending in the general direction of the wheel rim, a sliding control member in said spoke for operating a control of the motor, and means for sliding said control member when said handle is operated.

2. In a motor vehicle control, a steering wheel having a hollow spoke, a wheel rotatably mounted in the outer end of said spoke on an axis extending in the general direction of the wheel rim, a handle extending from said wheel to the exterior of the spoke for rotating the former, and a flexible control member slidable in said hollow spoke to operate a control of the motor, said flexible control member passing around the wheel in said hollow spoke to receive its motion therefrom.

3. In a motor vehicle control, a steering wheel provided with a hollow spoke having in one side an opening near the outer end of the spoke, a stub shaft carried by the opposite side of the spoke and extending across the interior of the latter and through said opening, a tubular shaft surrounding said stub shaft and adapted to be rotated by hand, a control member slidable in said hollow spoke, for operating a control of the motor, and means for sliding said control member when said tubular shaft is rotated.

4. In a motor vehicle control, a steering wheel having a hollow spoke provided at its outer end with a casing having in one side an opening, a stub shaft mounted on the other side of the casing and extending across the interior of the latter and through said opening, a wheel mounted on said stub shaft and located in said casing, a tubular shaft surrounding said stub shaft and extending from said wheel to be rotated by hand, and a flexible control member slidable in said hollow spoke to operate a control of the motor, said flexible control member passing around said wheel to receive its motion therefrom.

5. In a motor vehicle control, a steering wheel having a gap in its rim and a hollow spoke with its outer end located at said gap, a rotary handle in said gap, a control member in said hollow spoke for operating a control of the motor, and means for operating said control member from said handle.

6. In a motor vehicle control, a steering wheel having a gap in its rim and a hollow spoke whose outer end occupies part of such gap and is secured to the rim at one end of said gap, a stub shaft extending across the interior of the spoke and through an opening in one side thereof, one end of said stub shaft being mounted on the side of the spoke opposite said opening, and the other end thereof being secured to the wheel rim at the end of the gap opposite that to which the spoke is secured, a handle rotatable on said stub shaft, a control member in the hollow spoke for operating a control of the motor, and means for operating said control member from said handle.

7. In a motor vehicle control, a steering wheel having a spoke provided with upper and lower guide passages which communicate in the outer end of the spoke to provide a casing, a sprocket wheel in said casing with its axis extending in the general direction of the wheel rim, a sprocket chain trained around said sprocket wheel with its two reaches slidably received in said upper and lower passages, one of said reaches being adapted to operate a control of the motor, and means, including a handle, for rotating said sprocket wheel as required.

8. In a motor vehicle control, a steering wheel having a hollow spoke, a hollow steering shaft to which the wheel is secured and with which said spoke communicates, a flexible, sliding, control member in said spoke and curving downwardly into said hollow shaft to operate a control of the motor, means for guiding the curved portion of said flexible control member, and means, including a handle, for sliding said control member.

9. In a motor vehicle control, a steering wheel having a hollow spoke, a hollow steering shaft to which the wheel is secured and with which said spoke communicates, a flexible, sliding, control member in said spoke and curving downwardly into said hollow shaft, a sliding, centrally located, control rod in said hollow shaft to which said flexible control member is swiveled, and means, including a handle, for sliding said member.

10. In a motor vehicle control, a steering wheel having a hollow spoke, a hollow steering shaft on which the wheel is mounted and with which said hollow spoke communicates, a flexible, slidable, control member in said hollow spoke and curving downwardly into said hollow shaft to operate a control for the motor, means, including a handle, for sliding said control member, and double acting means for relatively holding said wheel and hollow shaft, and for guiding the curved portion of said control member.

11. In a motor vehicle control, a steering wheel having a hollow spoke, a hollow steering shaft on which the wheel is mounted and with which said hollow spoke communicates, a flexible, slidable, control member in said hollow spoke and curving downwardly into said hollow shaft to operate a control for the motor, means, including a handle, for sliding said control member, and a transverse key extending across said hollow shaft into the hub of the steering wheel, one lower corner of said key being removed on a curved line, to provide means for guiding the curved portion of said control member.

In testimony whereof I have hereunto set my hand.

ALBERT FRANK BEAUREGARD.